US008355922B1

(12) United States Patent
Sonie

(10) Patent No.: US 8,355,922 B1
(45) Date of Patent: Jan. 15, 2013

(54) SYSTEMS AND METHODS FOR PRIORITIZING REVIEW OF ITEMS

(75) Inventor: Omprakash N. Sonie, Ahmedabad (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/081,722

(22) Filed: Apr. 7, 2011

(51) Int. Cl.
*G06Q 10/00* (2012.01)
*G06Q 50/00* (2012.01)

(52) U.S. Cl. .......................................... 705/1.1; 705/311

(58) Field of Classification Search .................... 705/1.1, 705/311
See application file for complete search history.

(56) References Cited

U.S. PATENT DOCUMENTS

2003/0130998 A1* 7/2003 Fox et al. ........................... 707/3

OTHER PUBLICATIONS

Documents retrieved from www.iqreview.epiqsystems.com/ using Internet archive, WayBackMachine, showing a publication date of Mar. 2010, as evidenced by Document 1, 2, 3 and 4, (hereinafter referred to as Epiq).*

O'Neill, J., Privault, C., Renders, J.-M., Ciriza, V., Bauduin, G.: Disco: Intelligent Help for Document Review. In: Global E-Discovery/E-Disclosure Workshop—A Pre-Conference Workshop at the 12th International Conference on Artificial Intelligence and Law, Barcelona, Spain (2009).*

* cited by examiner

*Primary Examiner* — Dennis Ruhl
*Assistant Examiner* — Julie Meyers
(74) *Attorney, Agent, or Firm* — Advantedge Law Group

(57) ABSTRACT

A method for prioritizing review of items may include: 1) identifying a first group of items to be reviewed for relevance to a particular matter; 2) during a review of the first group of items, tracking a proportion of items from the first group that are indicated as being relevant; 3) determining a relevance trend for the first group of items that indicates a rate at which the proportion of items from the first group that are indicated as being relevant is changing as the review of the first group of items progresses; 4) using the relevance trend for the first group of items to prioritize the review of the first group of items. Various other methods, systems, and computer-readable media are also disclosed herein.

20 Claims, 6 Drawing Sheets

SYSTEMS AND METHODS FOR PRIORITIZING REVIEW OF ITEMS

BACKGROUND

Electronic discovery during litigation can present significant burdens and expenses for various types of enterprises, particularly for larger enterprises that may be involved in hundreds of legal disputes at any given time. Reviewing documents produced in a legal dispute may take weeks or months and cost hundreds of thousands of dollars.

As document review in a legal dispute progresses, an enterprise may discover information that helps the enterprise determine how to proceed in the dispute (e.g., whether to settle, mediate, proceed to court, etc.). Thus, it may be important to find the most relevant documents as quickly as possible to avoid unnecessary document review costs and other fees associated with ongoing litigation. Unfortunately, traditional document review systems may not provide adequate tools for prioritizing document review. What is needed, therefore, is a more efficient and effective mechanism for prioritizing document review.

SUMMARY

As will be described in greater detail below, the instant disclosure generally relates to systems and methods for prioritizing review of items. For example, a method for prioritizing review of items may include: 1) identifying a first group of items to be reviewed for relevance to a particular matter; 2) during a review of the first group of items, tracking a proportion of items from the first group that are indicated as being relevant; 3) determining a relevance trend for the first group of items that indicates a rate at which the proportion of items from the first group that are indicated as being relevant is changing as the review of the first group of items progresses; and 4) using the relevance trend for the first group of items to prioritize the review of the first group of items.

The relevance trend for the first group of items may be used for independent and/or relative prioritization of the first group of items. As an example of independent prioritization, using the relevance trend for the first group of items to prioritize the review of the first group of items may include determining that the relevance trend for the first group of items is greater than a predetermined threshold. As an example of relative prioritization, the method may further include: 5) identifying a second group of items to be reviewed for relevance to the particular matter; 6) during a review of the second group of items, tracking a proportion of items from the second group that are indicated as being relevant; 7) determining a relevance trend for the second group of items that indicates a rate at which the proportion of items from the second group that are indicated as being relevant is changing as the review of the second group of items progresses; and 8) determining that the relevance trend for the first group of items is greater than the relevance trend for the second group of items. In this example, using the relevance trend for the first group of items to prioritize the review of the first group of items may include prioritizing the review of the first group of items over the review of the second group of items.

To continue with the previous example of relative prioritization, the method may further include: 9) identifying a third group of items to be reviewed for relevance to the particular matter; 10) during a review of the third group of items, tracking a proportion of items from the third group that are indicated as being relevant; 11) determining a relevance trend for the third group of items that indicates a rate at which the proportion of items from the third group that are indicated as being relevant is changing as the review of the third group of items progresses; 12) determining that the relevance trend for the first group of items is less than the relevance trend for the third group of items. In this example, using the relevance trend for the first group of items to prioritize the review of the first group of items may include prioritizing the review of the third group of items over the review of the first group of items.

The relevance trend of a group of items may automatically be evaluated and/or assessed by a user when determining how to prioritize the group of items. For example, using the relevance trend for the first group of items to prioritize the review of the first group of items may include presenting the relevance trend of the first group of items to a user and receiving, from the user, information that enables the prioritization of the review of the first group of items. Additionally or alternatively, using the relevance trend for the first group of items to prioritize the review of the first group of items may include analyzing the relevance trend of the first group of items and automatically, without user input, prioritizing the review of the first group of items.

In some embodiments, a group of items may have an inherent order and/or may be reordered prior to review. In other embodiments, a group of items may be unordered.

According to certain embodiments, a group of items may be reviewed for a legal proceeding (e.g., a litigation matter), and using the relevance trend for the first group of items to prioritize the review of the first group of items may include prioritizing review of documents of the first legal proceeding relative to review of documents of a second legal proceeding.

In various embodiments, a system for prioritizing review of items may include: 1) an identification module programmed to identify a first group of items to be reviewed for relevance to a particular matter; 2) a tracking module programmed to, during a review of the first group of items, track a proportion of items from the first group that are indicated as being relevant; 3) a determination module programmed to determine a relevance trend for the first group of items that indicates a rate at which the proportion of items from the first group that are indicated as being relevant is changing as the review of the first group of items progresses; 4) a prioritization module programmed to use the relevance trend for the first group of items to prioritize the review of the first group of items; and 5) one or more processors configured to execute the identification module, the tracking module, the determination module and the prioritization module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
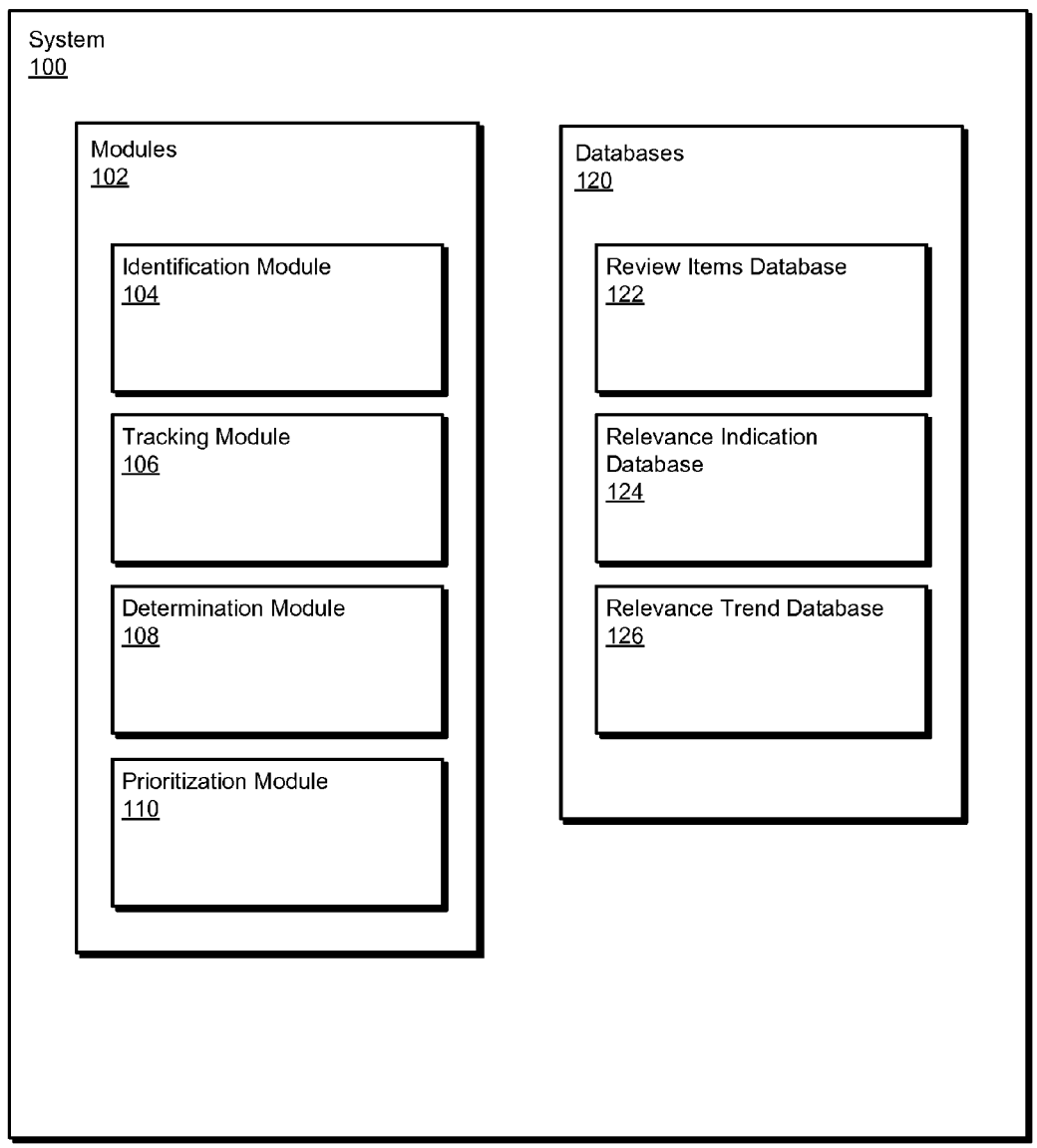
FIG. 1 is a block diagram of an exemplary system for prioritizing review of items.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for prioritizing review of items. Systems described herein may use input from a user (e.g., relevance determinations for reviewed items) to dynamically prioritize the review of groups of items. For example, a system for prioritizing the review of groups of items may determine relevance trends for one or more groups of items and may prioritize the review of the groups of items based on the relevance trends. In this manner, embodiments of the instant disclosure may ensure that the most relevant documents are reviewed first. Reviewing the most relevant documents first may help case administrators avoid unnecessary document review costs and other fees associated with ongoing litigation and/or other matters. Embodiments of the instant disclosure may also provide various other features and advantages.

Figure 2:
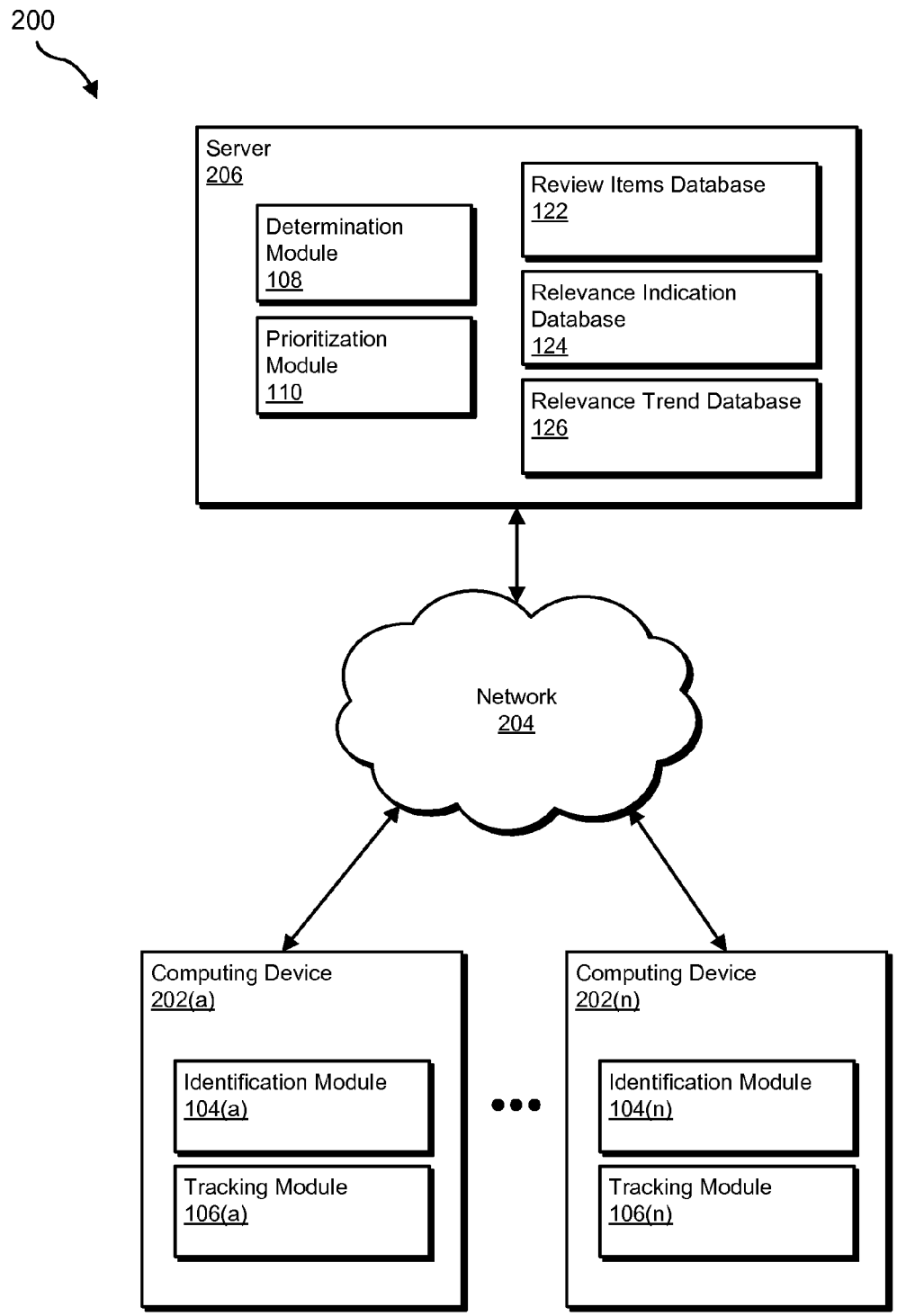
FIG. 2 is a block diagram of another exemplary system for prioritizing review of items.

The following will provide, with reference to FIGS. 1-2, detailed descriptions of exemplary systems for prioritizing review of items. Detailed descriptions of corresponding computer-implemented methods will also be provided in connection with FIG. 3. Detailed descriptions of example of relevance trends will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for prioritizing review of items. As illustrated in this figure, exemplary system 100 may include one or more modules 102 for performing one or more tasks. For example, and as will be explained in greater detail below, exemplary system 100 may include an identification module 104 programmed to identify a first group of items to be reviewed for relevance to a particular matter. Exemplary system 100 may also include a tracking module 106 programmed to, during a review of the first group of items, track a proportion of items from the first group that are indicated as being relevant.

In addition, and as will be described in greater detail below, exemplary system 100 may include a determination module 108 programmed to determine a relevance trend for the first group of items that indicates a rate at which the proportion of items from the first group that are indicated as being relevant is changing as the review of the first group of items progresses. System 100 may also include a prioritization module 110 programmed to use the relevance trend for the first group of items to prioritize the review of the first group of items. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(a)-(n) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a review items database 122 for storing one or more groups of items to be reviewed. System 100 may also include a relevance indication database 124 that may store user's indications of relevance and/or non-relevance for items from review items database 122. System 100 may further include a relevance trend database 126 that may store one or more relevance trends calculated for one or more of the groups of items from review items database 122.

Databases 120 in FIG. 1 may represent a portion of one or more computing devices. For example, databases 120 may represent a portion of server 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as server 206 in FIG. 2 computing system 510 in FIG. 5 and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include computing devices 202(a)-(n) in communication with a server 206 via a network 204. Computing devices 202(a)-(n) may be computing devices of document reviewers, and server 206 may be a server through which document review is managed. Computing devices 202(a)-(n) may include identification modules 104(a)-(n) and tracking modules 106(a)-(n). Server 206 may include determination module 108, prioritization module 110, review items database 122, relevance indication database 124, and relevance trend database 126.

While FIG. 2 shows determination module 108, prioritization module 110, review items database 122, relevance indication database 124, and relevance trend database 126 on server 206, one or more of these modules and/or databases may be located on one or more of computing devices 202(a)-(n). Similarly, while FIG. 2 shows identification modules 104(a)-(n) and tracking modules 106(a)-(n) located on computing devices 202(a)-(n), one or more of these modules may be located on server 206.

Computing devices 202(a)-(n) generally represent any type or form of computing device capable of reading computer-executable instructions. Examples of computing devices 202(a)-(n) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of managing document review for one or more users. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections.

While FIG. 2 represents a client-server implementation of embodiments of the instant disclosure, the systems described herein may be implemented on a single computing system and/or configured in any other suitable manner.

Figure 3:
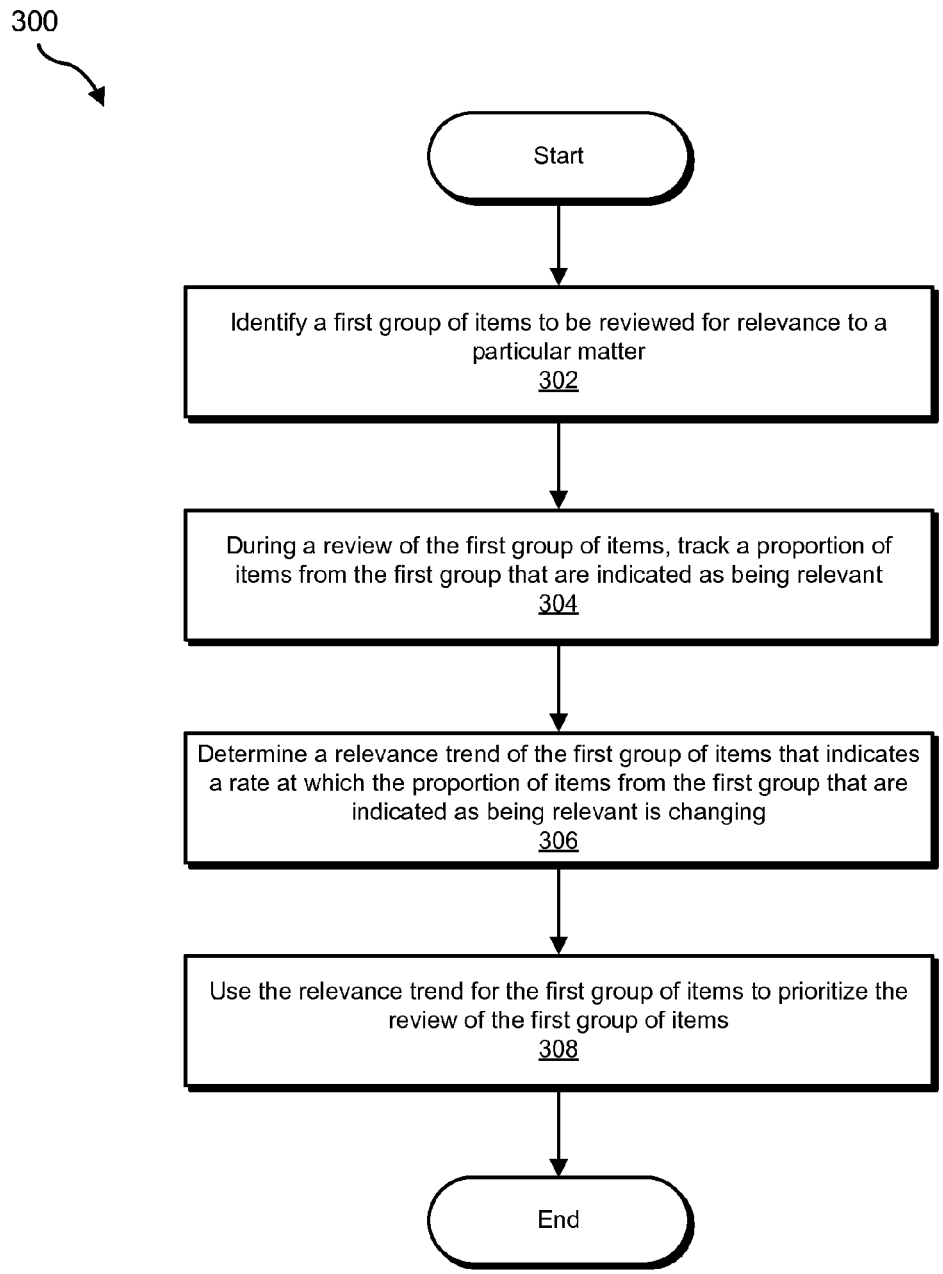
FIG. 3 is a flow diagram of an exemplary method for prioritizing review of items.

FIG. 3 is a flow diagram of an exemplary computer-implemented method 300 for prioritizing review of items. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As step 302 in FIG. 3, one or more of the systems described herein may identify a first group of items to be reviewed for relevance to a particular matter. For example, identification module 104 in FIG. 1 (which may, as detailed above, represent a portion of one or more of computing devices 202(a)-(n) in FIG. 2) identify a first group of items from review items database 122 on server 206 for relevance to a particular matter.

The first group of items to be reviewed for relevance may be identified in a variety of contexts and manners. For example, the first group of items may be a group of items associated with a legal proceeding, such as a dispute that is being mediated, arbitrated, and/or litigated. The group of items may also be relevant to any other type of subject matter, including subject matter related to a particular work project, a school project, and/or a personal matter.

As used here, the phrase "group of items" generally refers to any set of one or more items that may be reviewed by a user. Such items may include, for example, document files, emails, financial records, business records, phone records, journal entries, tax records, and/or any other type or form of data that may be reviewed by a user.

Items may be grouped in a variety of different ways. For example, items may be filtered by subject matter, by date, by relevance, and/or using any other metric to divide items into groups. In one example, a group of items may be a set of emails from a particular user from a particular period of time. As another example, a group of items may include a set of marketing documents about a particular product. As a third example, a group of items may include a set of financial transactions from a fiscal year of an enterprise.

A group of items may be ordered and/or unordered. In some situations, a group of items may be inherently ordered after being located by a search engine. As used herein, the phrase "inherently ordered" generally refers to a group of items that has ordering inherent in how they were stored, how they were returned from a search engine, and/or any ordered in any other way that does not require explicit reordering. For example, a group of items that includes a set of emails may be ordered according to email date and time. As another example, a group of text messages may be inherently ordered by sender and/or recipient.

Groups of items may be explicitly ordered by identification module 104 and/or any other suitable mechanism (e.g., an ordering module). For example, identification module 104 may order a group of items by date, by sender, by recipient, by subject, by relevance, by size, and/or using any other type of ordering metric. In some embodiments, a group of items may be ordered before they are reviewed. Alternatively, a group of items may be ordered after they are reviewed. For example, data gathered during a review of a group of items may be used to order the group of items (e.g., a group of items may be ordered according to relevance).

At step 304 in FIG. 3, one or more of the systems described herein may, during a review of the first group of items, track a proportion of items from the first group that are indicated as being relevant. For example, tracking module 106 (which may, as detailed above, be part of one or more of computing devices 202(a)-(n) in FIG. 2) track a proportion of items from the first group that are indicated as being relevant.

Items may be marked for relevance in a variety of different contexts. For example, a reviewer may be reviewing items for relevance to a particular matter by determining whether they are related to a particular matter (e.g., whether an email discusses a subject related to the particular matter, whether a document includes information related to the particular matter, etc.). A reviewer may additionally or alternatively review an item for relevance by determining whether an item is relevant to an attorney-client privilege or other privilege. In some embodiments, a reviewer may review an item for relevance by determine whether the item contains confidential information and/or other sensitive information.

Tracking module 106 may track a proportion of items that are identified as being relevant in any suitable manner. For example, tracking module 106 may detect each time a user indicates an item is relevant and keep a count, in relevance indication database 124 or elsewhere, of how many items the user has indicated as being relevant. To determine a proportion of items from a group that are relevant, tracking module 106 may compute a ratio of total items identified as being relevant to the total number of items reviewed by a reviewer. In other words, tracking module 106 may calculate a proportion of relevant items by determining a ratio of items indicated as being relevant to the total number of items reviewed. Tracking module 106 may additionally or alternatively use any other algorithm and/or heuristic to track a proportion of items that are indicated as being relevant.

Tracking module 106 may calculate the proportion of relevant items from the first group of items continuously during a review, in predetermined time intervals (e.g., every 10 minutes), in predetermined intervals of reviewed documents (e.g., every 100 documents), and/or in any other suitable manner.

As step 306 in FIG. 3, one or more of the systems described herein may determine a relevance trend for the first group of items that indicates a rate at which the proportion of items from the first group that are indicated as being relevant is changing as the review of the first group of items progresses. For example, determination module 108 (which may, as shown in FIG. 2, be part of server 206) determine a relevance trend for a group of items being reviewed by a user of computing device 202(a) as a review of the group of items progresses (e.g., as the review progresses in time, in number of documents reviewed, etc.).

Figure 4:
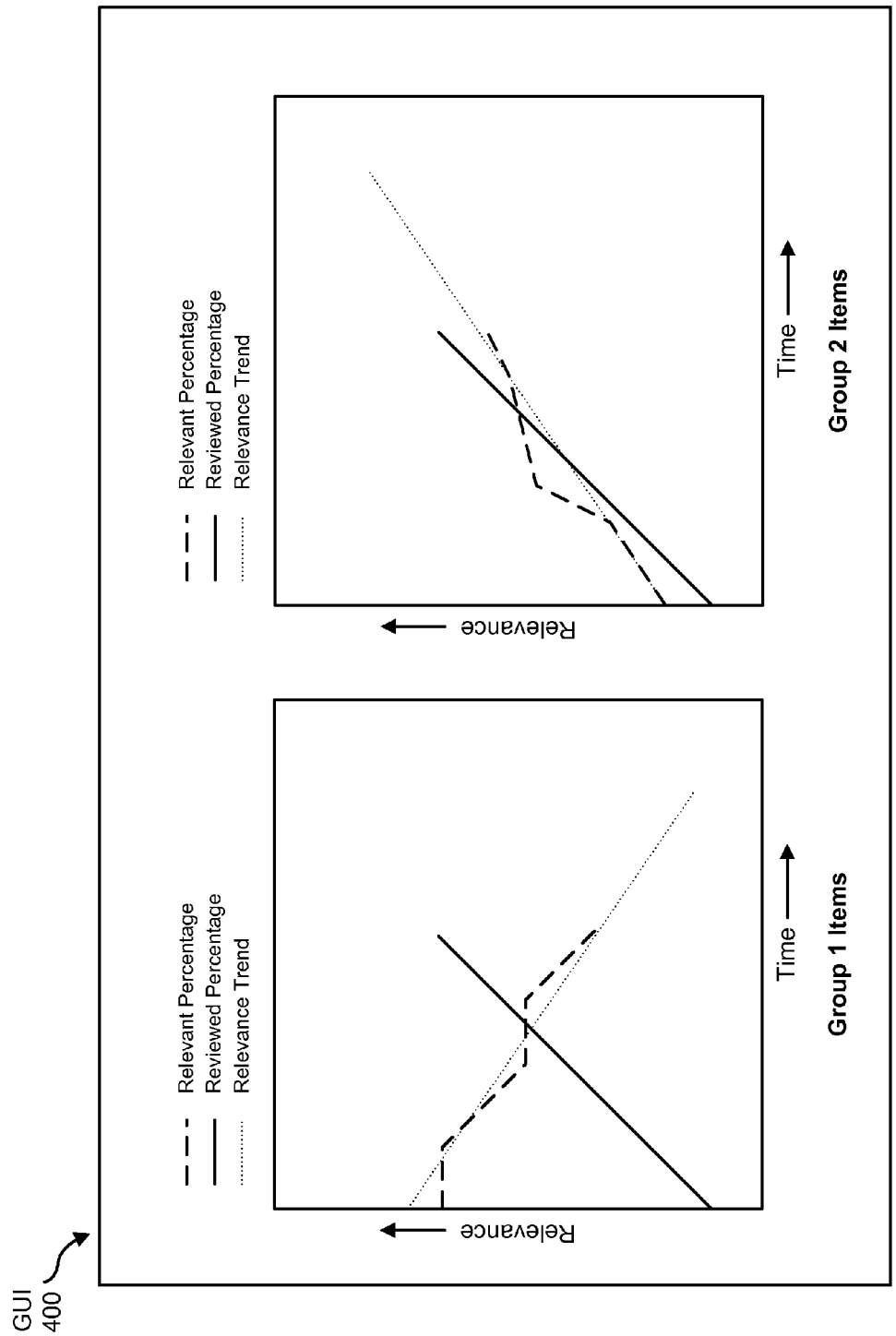
FIG. 4 is a diagram on an exemplary graphical user interface that shows relevance trends for groups of items.

As used herein, the phrase "relevance trend" generally refers to a rate at which a proportion of items of a group that are indicated as being relevant changes during review of the group of items. For example, a relevance trend may indicate a rate of change of how many items are indicated as being relevant with respect to time. FIG. 4 shows a graphical representation of examples of relevance trends, and the discussion corresponding to FIG. 4 provides various additional details and examples of relevance trends.

Determination module 108 may determine a relevance trend in many different ways. For example, determination module 108 may determine a relevance trend for a group of items by determining a rate of change of the proportion of items indicated as being relevant. In one example, a relevance trend may be calculated by determining a slope of a line that represents the proportion of items being found as relevant relative to time and/or review progress. Thus, a relevance trend with a positive slope indicates that items within a group are increasingly being indicated relevant, while a negative slope indicates that items within a group are decreasingly being found as relevant. Furthermore, a relevance trend for a first group of items with a higher positive slope than a second group of items indicates that the number of items being found as relevant for the first group is increasing more quickly than the second group. Additionally or alternatively, determination module 306 may determine a relevance trend by determining whether the number of items marked as being relevant is increasing or decreasing as a review of a group of items progresses.

At step 308 in FIG. 3, one of more of the systems described herein may use the relevance trend for the first group of items to prioritize the review of the first group of items. For example, prioritization module 110 (which may, as detailed above, represent a portion of server 206 in FIG. 2) may use the relevance trend computed by determination module 108 to prioritize the review of a group of items reviewed by the user of computing device 202(a).

Prioritization module 110 may use the relevance trend for the first group of items to prioritize the review of the first group of items in a variety of ways. For example, prioritization module 110 may present the relevance trend of the first group of items to a user. In some examples, prioritization module 108 may display a graph or other report to a user that indicates the relevance trend of the first group of items to the user. In response to seeing the relevance trend, the user may determine whether to continue reviewing the first group of items or to switch to review a different group of items based on the relevance trend. Then prioritization module 108 may receive, from the user, information that enables the prioritization of the review of the first group of items. For example, prioritization module 108 may receive a request from the user to provide the user with a different group of items that may have a more favorable (e.g., higher) relevance trend.

Additionally or alternatively, prioritization module 110 may analyze the relevance trend of the first group of items and may automatically, without user input, prioritize the review of the first group of items. For example, prioritization module 110 may determine that the relevance trend of the first group of items is less than the relevance trend of a second group of items and may prompt the user to switch from reviewing the first group of items to the second group of items based on the relevance of the two groups of items. As another example, prioritization module 108 may use the relevance trend for the first group of items to prioritize the review of the first group of items by determining whether the relevance trend for the first group of items is greater or less than a predetermined threshold. If the relevance trend for the first group of items is less than a predetermined threshold, prioritization module 110 may terminate or delay a review of the first group of items and/or may initiate review of an alternative group of items. On the other hand, if the relevance trend for the first group of items is greater than a predetermined threshold, prioritization module 110 may allow the user to continue with the review of the first group of items.

Prioritization module 110 may use relevance trends of one or more groups of items to prioritize reviews in a variety of different contexts. For example, the first group of items may be documents, files, and/or other data associated with a first legal proceeding (e.g., litigation matter). Prioritization module 110 may determine that a second group of items associated with the first legal proceeding has a higher relevance trend than the first group of items and may prioritize the review of the second group of items over the first group of items. Additionally or alternatively, prioritization module 110 may prioritize the review of groups of items for a variety of different matters (e.g., for two or more different legal proceedings). If a reviewer is reviewing groups of documents related to various different legal proceedings, the reviewer may be provided with the most effective group of items for review (i.e., the group of items with the highest relevance trend). In this manner, embodiments of the instant disclosure may facilitate efficient and effective distribution of workload among various matters and/or between various reviewers.

As used herein, the phrase "prioritizing review of a group of items" generally refers to any algorithm or heuristic for selecting one group of items for prioritization over another group of items and/or for indicating how important it is for a group of items to be reviewed. In some embodiments, prioritization of a group of items for review may be an absolute prioritization that indicates a priority of a group of items on a numerical scale or using any other suitable metric.

In other examples, the prioritization of a group of items may be a relative prioritization that indicates a priority of a group of items relative to one or more other groups of items. For example, identification module 104 may identify a second group of items to be reviewed for relevance to the particular matter, and tracking module 106 may, during review of the second group of items, track a proportion of items from the second group that are indicated as being relevant. Determination module 108 may then determine a relevance trend for the second group of items, and prioritization module 108 may determine that the relevance trend for the first group of items is greater than the relevance trend for the second group of items. As a result of this determination, prioritization module 110 may prioritize the review of the first group of items over the review of the second group of items.

To continue with the previous example, identification module 104 may identify a third group of items to be reviewed for relevance to the particular matter. Then, tracking module 106 may, during a review of the third group of items, track a proportion of items from the third group of items that are indicated as being relevant. Determination module 108 may determine a relevance trend for the third group of items that indicates a rate at which the proportion of items from the third group that are indicated as being relevant is changing as the review of the third group of items progresses. Prioritization module 110 may determine that the relevance trend for the first group of items is less than the relevance trend for the third group of items and may prioritize the review of the third group of items over the review of the first group of items.

Prioritization module 110 may perform one or more of a variety of actions when prioritizing groups of items for review. For example, if prioritization module 110 determines that two groups of items being reviewed by a first reviewer both have higher priority (e.g., higher relevance trends) than a group of items being reviewed by a second reviewer, prioritization module 110 may interrupt the review being performed by the second reviewer and may reassign one of the groups of documents from the first user to the second user. As another example, prioritization module 110 may direct a user to stop reviewing a group of items if the relevance trend for the group of items falls below a certain threshold (e.g., if the relevance trend changes from positive to negative). Prioritization module 110 may then provide the user with a different group of items to review.

FIG. 4 is an exemplary Graphical User Interface ("GUI") 400 that shows relevance trends for two different groups of items, Group 1 and Group 2. In this example, the relevance trend graphs show time on the x-axis and relevance on the y-axis. Relevance trends may also be graphed and/or otherwise represented in a variety of other manners. For example, a relevance trend may be graphed with relevance on the y-axis and number of documents reviewed (instead of time) on the x-axis.

FIG. 4 shows that a relevance trend may be extrapolated based on relevance data collected during a review. Such relevance trends may also be projected into the future to indicate an expectation of the relevant proportion of a group of documents if a reviewer continues to review the group of documents.

For example, a user may review a portion of the items of a first group (Group 1). The user may review a percentage of the items (e.g. 10%), may review a predetermined number of items, and/or may review items for a predetermined amount of time. After reviewing the portion of items from Group 1, a relevance trend may be calculated for the Group 1 items. As shown in FIG. 4, as time and the number of reviewed documents progresses, the percentage of items from group 1 marked as relevant decreases. Thus, the relevance trend for Group 1 is decreasing and has a negative slope.

The user may then switch to reviewing a portion of the items of a second group (Group 2). As time and the number of reviewed documents progresses, the percentage of items from group 2 marked as relevant increases. Thus, the relevance trend for Group 2 is increasing and has a positive slope. The relevance trends for Group 1 and Group 2 may be represented by their slopes, and in this example the relevance trend for Group 2 is greater than the relevance trend for Group 1 since Group 2 has a greater slope than Group 1 even though the proportion of relevant items in Group 1 was initially greater than the proportion of relevant items in Group 2. Thus, Group 2 may be prioritized over Group 1 for further review. As such, the user may complete a review of Group 2 items before returning to a review of Group 1 items.

As shown in the previous discussion, the systems and methods disclosed herein may determine priority trends for groups of items and may facilitate prioritization of such groups of items for review. Groups of items may be prioritized within an individual matter (e.g., single litigation case) and/or across multiple maters (e.g., multiple litigation cases). Thus, reviewers and/or case administrators may be able to prioritize reviews (or prioritization module 110 may automatically prioritize reviews) and allocate resources within a single matter or across multiple manners to more effectively and efficiently use time and/or other resources. In this manner, a case administrator may obtain the most relevant information regarding a case and may be able to relatively quickly and efficiently make decisions about how to proceed with a case (e.g., whether to settle, mediate, arbitrate, go to court, etc.). Embodiments of the instant disclosure also provide various other features and advantages.

Figure 5:
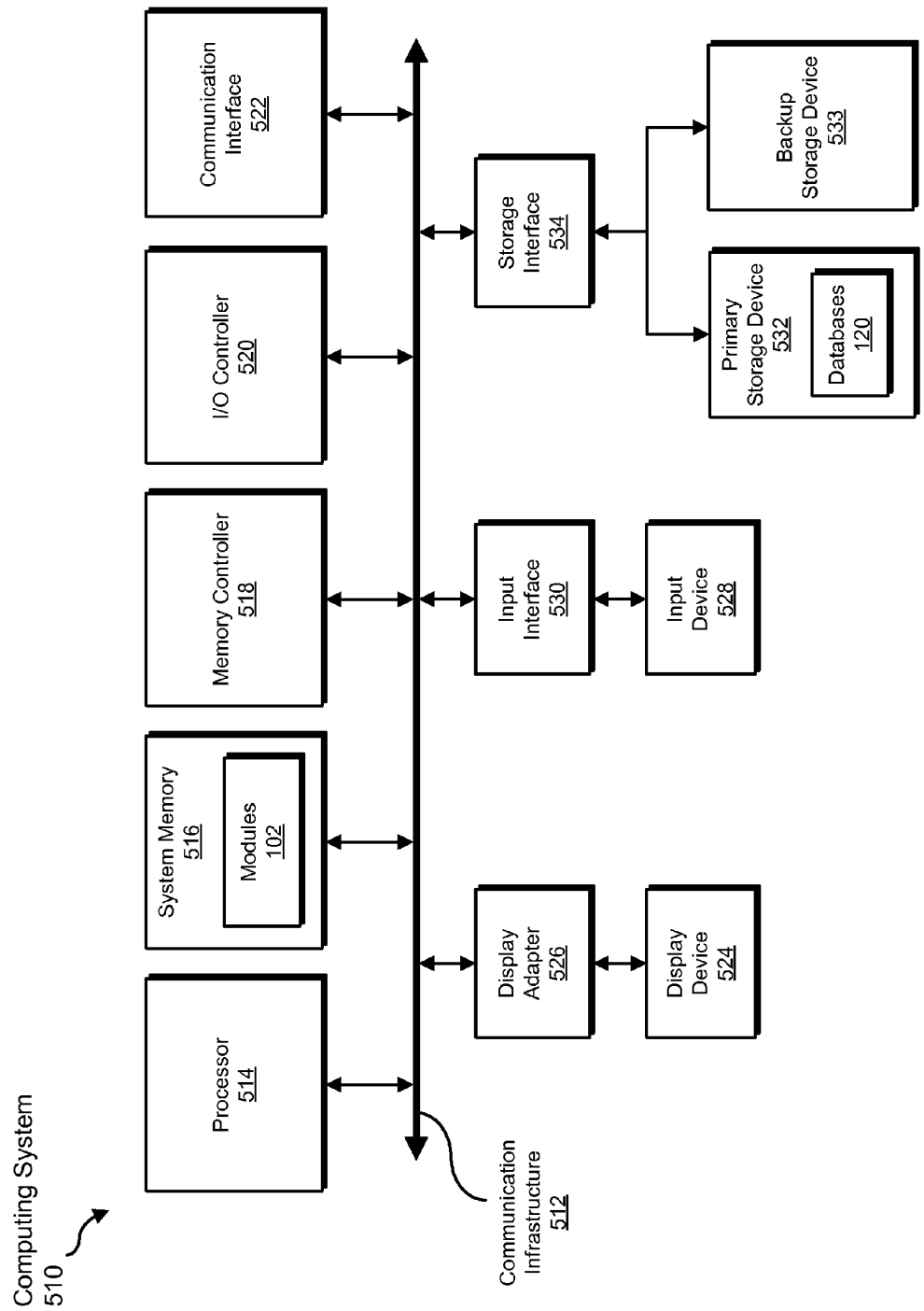
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, tracking, determining, using, prioritizing, and ordering steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, tracking, determining, using, prioritizing, and ordering.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, tracking, determining, using, prioritizing, and ordering steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, tracking, determining, using, prioritizing, and ordering steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, tracking, determining, using, prioritizing, and ordering steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, tracking, determining, using, prioritizing, and ordering steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
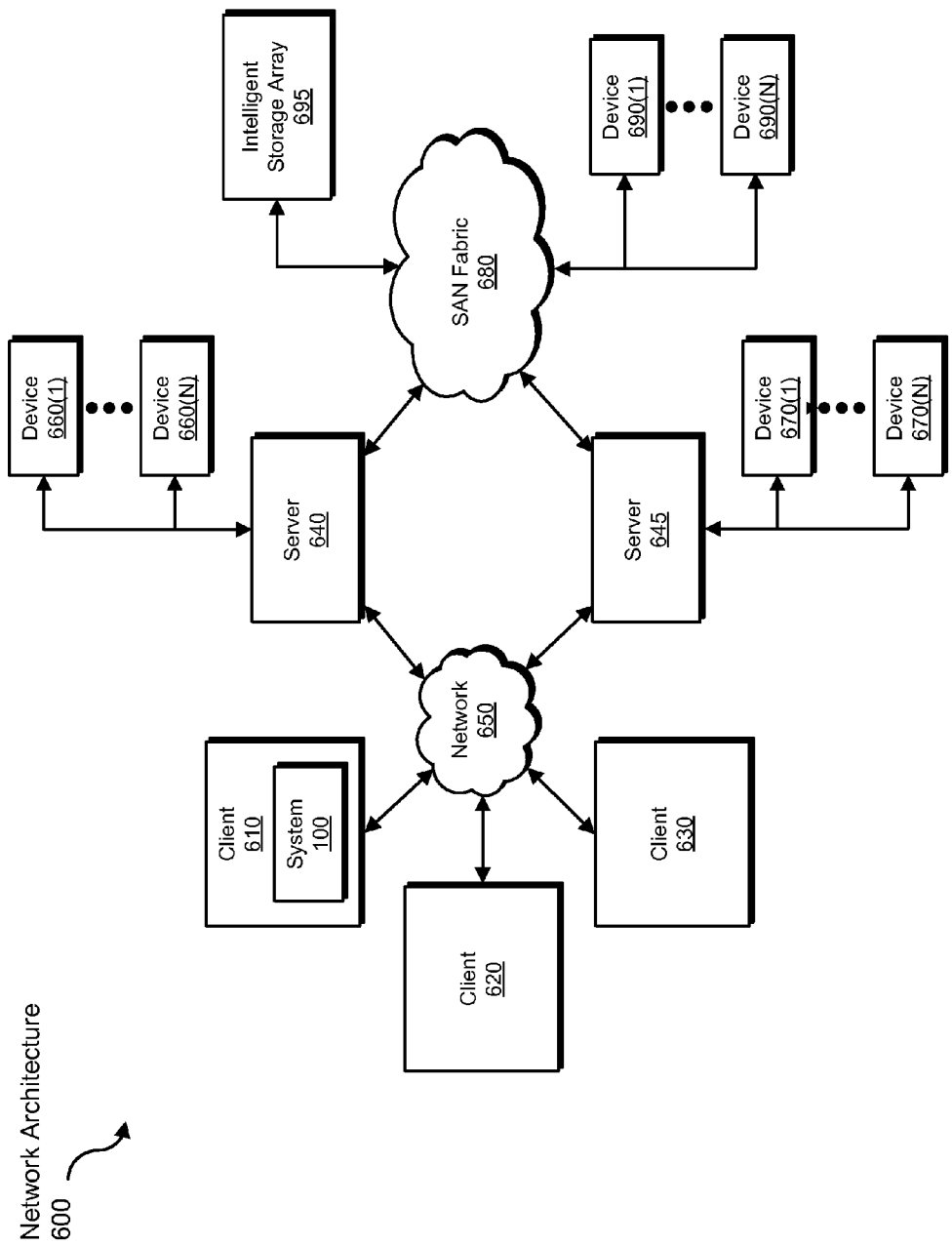
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, tracking, determining, using, prioritizing, and ordering steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for prioritizing review of items.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a system that tracks relevance of documents into a system that tracks relevance trends and presents relevance trends of documents to a user.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for prioritizing review of items, the method comprising:
   identifying a first group of items to be reviewed for relevance to a particular matter, the first group of items being ordered;
   during a review of the first group of items, tracking a proportion of items from the first group that are indicated as being relevant;
   determining a relevance trend for the first group of items that indicates a rate at which the proportion of items from the first group that are indicated as being relevant is changing as the review of the first group of items progresses, wherein the relevance trend of the first group of items is indicative of whether items within the first group are increasingly being indicated as relevant or decreasingly being indicated as relevant;
   using the relevance trend for the first group of items to prioritize the review of the first group of items, wherein at least one of the identifying, tracking, determining, and using steps are performed by a computing device comprising at least one processor.

2. The method of claim 1, wherein using the relevance trend for the first group of items to prioritize the review of the first group of items comprises:
   determining that the relevance trend for the first group of items is greater than a predetermined threshold.

3. The method of claim 1, further comprising:
   identifying a second group of items to be reviewed for relevance to the particular matter;
   during a review of the second group of items, tracking a proportion of items from the second group that are indicated as being relevant;
   determining a relevance trend for the second group of items that indicates a rate at which the proportion of items from the second group that are indicated as being relevant is changing as the review of the second group of items progresses;
   determining that the relevance trend for the first group of items is greater than the relevance trend for the second group of items, wherein using the relevance trend for the first group of items to prioritize the review of the first group of items comprises prioritizing the review of the first group of items over the review of the second group of items.

4. The method of claim 3, further comprising:
   identifying a third group of items to be reviewed for relevance to the particular matter;
   during a review of the third group of items, tracking a proportion of items from the third group that are indicated as being relevant;
   determining a relevance trend for the third group of items that indicates a rate at which the proportion of items from the third group that are indicated as being relevant is changing as the review of the third group of items progresses;
   determining that the relevance trend for the first group of items is less than the relevance trend for the third group of items, wherein using the relevance trend for the first group of items to prioritize the review of the first group of items comprises prioritizing the review of the third group of items over the review of the first group of items.

5. The method of claim 1, wherein using the relevance trend for the first group of items to prioritize the review of the first group of items further comprises:
   presenting the relevance trend of the first group of items to a user;
   receiving, from the user, information that enables the prioritization of the review of the first group of items.

6. The method of claim 1, wherein using the relevance trend for the first group of items to prioritize the review of the first group of items further comprises:
   analyzing the relevance trend of the first group of items;
   automatically, without user input, prioritizing the review of the first group of items.

7. The method of claim 1, further comprising:
   before the review of the first group of items, ordering items within the first group according to a predetermined criteria.

8. The method of claim 1, wherein:
   determining the relevance trend comprises calculating a slope of a line that represents the proportion of items from the first group that are indicated as being relevant relative to the progress of the review of the first group of items.

9. The method of claim 8, wherein using the relevance trend for the first group of items to prioritize the review of the first group of items comprises:
   determining whether the slope is positive or negative;
   if the slope is positive, determining that the items within the first group of items are increasingly being found as relevant;
   if the slope is negative, determining that the items within the first group of items are decreasingly being found as relevant.

10. A system for prioritizing review of items, the system comprising:
    an identification module programmed to identify a first group of items to be reviewed for relevance to a particular matter, the first group of items being ordered;

a tracking module programmed to, during a review of the first group of items, track a proportion of items from the first group that are indicated as being relevant;

a determination module programmed to determine a relevance trend for the first group of items that indicates a rate at which the proportion of items from the first group that are indicated as being relevant is changing as the review of the first group of items progresses, wherein the relevance trend of the first group of items is indicative of whether items within the first group are increasingly being indicated as relevant or decreasingly being indicated as relevant;

a prioritization module programmed to use the relevance trend for the first group of items to prioritize the review of the first group of items;

one or more processors configured to execute the identification module, the tracking module, the determination module, and the prioritization module.

11. The system of claim 10, wherein the prioritization module is programmed to use the relevance trend for the first group of items to prioritize the review of the first group of items by:

determining that the relevance trend for the first group of items is greater than a predetermined threshold.

12. The system of claim 10, wherein:

the identification module is programmed to identify a second group of items to be reviewed for relevance to the particular matter;

the tracking module is programmed to, during a review of the second group of items, track a proportion of items from the second group that are indicated as being relevant;

the determination module is programmed to determine a relevance trend for the second group of items that indicates a rate at which the proportion of items from the second group that are indicated as being relevant is changing as the review of the second group of items progresses;

the prioritization module is programmed to:
  determine that the relevance trend for the first group of items is greater than the relevance trend for the second group of items;
  use the relevance trend for the first group of items to prioritize the review of the first group of items by prioritizing the review of the first group of items over the review of the second group of items.

13. The system of claim 12, wherein:

the identification module is programmed to identify a third group of items to be reviewed for relevance to the particular matter;

the tracking module is programmed to, during a review of the third group of items, track a proportion of items from the third group that are indicated as being relevant;

the determination module is programmed to determine a relevance trend for the third group of items that indicates a rate at which the proportion of items from the third group that are indicated as being relevant is changing as the review of the third group of items progresses;

the prioritization module is programmed to:
  determine that the relevance trend for the first group of items is less than the relevance trend for the third group of items;
  use the relevance trend for the first group of items to prioritize the review of the first group of items by prioritizing the review of the third group of items over the review of the first group of items.

14. The system of claim 10, wherein the prioritization module is programmed to use the relevance trend for the first group of items to prioritize the review of the first group of items further by:

presenting the relevance trend of the first group of items to a user;

receiving, from the user, information that enables the prioritization of the review of the first group of items.

15. The system of claim 10, wherein the prioritization module is programmed to use the relevance trend for the first group of items to prioritize the review of the first group of items further by:

analyzing the relevance trend of the first group of items;

automatically, without user input, prioritizing the review of the first group of items.

16. The system of claim 10, further comprising:

an ordering module programmed to, before the review of the first group of items, order items within the first group according to a predetermined criteria.

17. The system of claim 10, wherein:

the particular matter for which the first group of items is reviewed comprises a first legal proceeding.

18. The system of claim 17, wherein the prioritization module is programmed to use the relevance trend for the first group of items to prioritize the review of the first group of items by:

prioritizing review of documents of the first legal proceeding relative to review of documents of a second legal proceeding.

19. A non-transitory computer-readable medium comprising one or more computer-executable instructions that, when executed by at least one processor of a computing device, cause the computing device to:

identify a first group of items to be reviewed for relevance to a particular matter, the first group of items being ordered;

during a review of the first group of items, track a proportion of items from the first group that are indicated as being relevant;

determine a relevance trend for the first group of items that indicates a rate at which the proportion of items from the first group that are indicated as being relevant is changing as the review of the first group of items progresses, wherein the relevance trend of the first group of items is indicative of whether items within the first group are increasingly being indicated as relevant or decreasingly being indicated as relevant;

use the relevance trend for the first group of items to prioritize the review of the first group of items.

20. The non-transitory computer-readable medium of claim 19, wherein the one or more computer-executable instructions are programmed to cause the computing device to use the relevance trend for the first group of items to prioritize the review of the first group of items by:

determining that the relevance trend for the first group of items is greater than a predetermined threshold.

* * * * *